J. ROBERTSON.
Making Sheet Lead.
No. 50,036.
Patented Sept. 19, 1865.
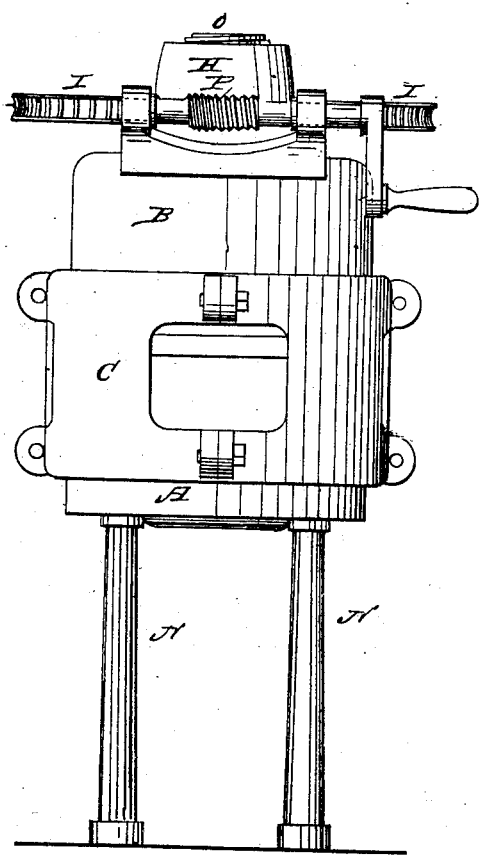
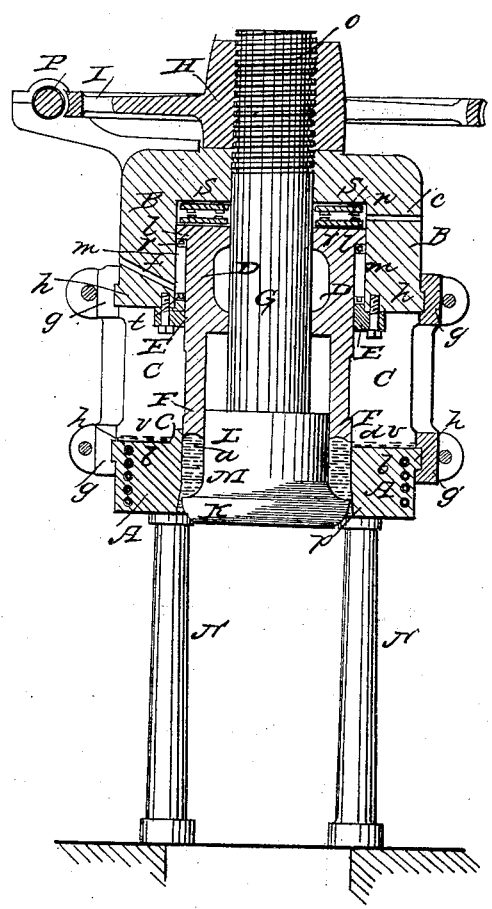
Witnesses:
R W Coombs
Geo Reed
Inventor:
John Robertson

UNITED STATES PATENT OFFICE.

JOHN ROBERTSON, OF BROOKLYN, NEW YORK.

MACHINE FOR MANUFACTURING SHEET-LEAD.

Specification forming part of Letters Patent No. 50,036, dated September 19, 1865.

*To all whom it may concern:*

Be it known that I, JOHN ROBERTSON, of the city of Brooklyn, in the county of Kings and State of New York, have invented a certain new and useful Improvement in Machinery for the Manufacture of Sheet-Lead; and I do hereby declare that the following is a full, clear, and exact description of the same, reference being had to the accompanying drawings, which form part of this specification, in which—

Figure 1 is an elevation of a machine constructed according to my invention; and Fig. 2 is a central vertical section of the same.

Similar letters of reference indicate corresponding parts in the several figures.

In the year 1851 I obtained Letters Patent, No. 8,112, for an improved combination of dies for the manufacture of sheet-lead, such dies having the melted lead forced through or between them by hydraulic pressure, and the lead being delivered in the form of a tube, which, being cut through longitudinally, produced the sheet. The machinery described in those Letters Patent for the use of such combination of dies was defective in the construction and arrangement of its parts, first, because the tube of lead had to be discharged in an upward direction, and it was difficult to sustain it against buckling; secondly, because it was difficult to fill the lead-chamber from which the lead was pressed between the dies; and, thirdly, because the central bolt, to which is attached the inner die or core, around which the tube is formed, was not well supported laterally near where the said die was connected with it.

My present invention consists in an improved construction and arrangement of the parts, whereby those defects are remedied and provision is afforded for adjusting the core or inner die to vary the thickness of the lead, in case it should be necessary, after the operation of forming a tube or sheet has been commenced.

To enable others skilled in the art to make and use my invention, I will proceed to describe it with reference to the drawings.

A is a circular bed-plate of proper dimensions, with a circular opening, *a*, Fig. 2, of a diameter according to the size of the tube or width of the sheet I wish to produce. The upper part of this opening is cylindrical and the lower part is increased in size toward the bottom of the bed-plate in taper form, to make it serve as the exterior die. The said bed-plate has cast in it a coil of pipe, *b*, Fig. 2, for the admission of steam, so as to give to the bed-plate the proper temperature before setting the machine in operation. The said bed-plate is also provided at the top with an annular projection, *c*, Fig. 2, surrounding the opening *a*. A part of this annular projection *c* is cut off at several places, so as to make openings. (Shown at *d*, Fig. 2.)

B is a strong cylinder of cast-iron, open at the bottom and closed at the top, with the exception of a small central opening. This cylinder B, Fig. 2, is provided with two small openings—one, *e*, Fig. 2, at the upper end, and one, *f*, Fig. 2, toward the lower end of the bore of the cylinder—for the admission and escape of water, the said openings communicating by suitable tubes with a force-pump.

The bed-plate A and cylinder B are connected by means of a circular frame, C, made in several parts and bolted together, the said frame being provided with inside grooves, *g*, at both ends, and the bed-plate A and cylinder B being provided with outside projections, *h*, fitting into the grooves *g*, thereby firmly uniting the bed-plate and cylinder B and keeping them in proper relative positions.

Within the lower part of the frame, and upon or in the bed-plate, is formed a receptacle, *v*, Fig. 2, for the lead before it enters into the lead-chamber M, to be presently described.

Into the cylinder B, I fit the ram D, having around the exterior of its upper end a flange, *l*. Into the lower end of the cylinder B is fitted the gland E, which closes the space left around the ram within the cylinder and forms a tight annular water-chamber, *m*, Fig. 2, for the reception of water for raising the ram. Above the upper end or head of the ram is the water-chamber *n*, for the reception of water for depressing the ram.

To the lower end of the ram is attached the annular plunger F, which is fitted accurately into the cylindrical portion of the circular opening *a* in the bed-plate, such portion of the said opening forming the outer sides of the annular lead-chamber M, from which the lead is forced between the dies by the plunger F.

Through openings in the center of the bed-plate A, the head of the cylinder B, the ram D, and the plunger F there passes a stout bolt, G, having a screw, *o*, on its upper end, by which, through the means of the nut H, resting on the top of the cylinder, the said bolt is supported and its position regulated. The said nut is formed or secured in the hub of a worm-wheel, I, with which is geared an endless screw, P, for the purpose of turning the nut, and so raising or lowering the bolt G. The lower end of the bolt G has formed upon it a head, K, which constitutes the core or inner die, around which the lead pipe is formed; and above the said head, core, or die the said bolt is furnished with a cylindrical collar, L, which fits the cylindrical interior of the plunger F and forms the inner sides of the annular lead-chamber M, the top of which is formed by the lower end of the plunger F and the bottom by a portion of the collar L.

By raising or lowering the bolt G the core or inner die, K, will be made to regulate the thickness of the lead, which is governed by the distance between the edge of the core or inner die and the inclined sides, $p$, of the opening in the bed-plate A. This adjustment of the bolt G, effected by means of the nut H, may be made while the machine is in operation in case it should be found that the lead is coming out in too great or too little thickness after the operation of forming a tube or sheet has commenced.

The ram D is fitted with a cup-packing, $q$, at the top, to prevent leakage of water between it and the cylinder B and central bolt, G, and with another cup-packing, $r$, to prevent leakage between it and the cylinder. The head of the cylinder is fitted with a similar packing, $s$, to prevent leakage between it and the central bolt, and the gland E is fitted with a similar packing, $t$, to prevent leakage at the bottom of the cylinder and around the ram.

The machine may be supported upon columns W of sufficient height, or arranged over a pit of suitable depth, so that lead pipe or sheet-lead of any required length may be discharged from it in a downward direction.

The operation of the machine is as follows: The bed-plate, dies, and plunger having been brought to a proper temperature by the admission of steam through the coil of pipe $b$, the plunger is raised up above the lower edges of the openings $d$, Fig. 2, by forcing water into the cylinder below the the flange $l$ or head of the ram through the opening $f$. Melted lead being then poured into the receptacle $v$ on the top of the bed-plate, runs through the openings $d$ into the lead-chamber M and fills the said chamber. The water is now allowed to escape from the lower part of the cylinder B through the opening $f$, and water is forced by the pump into the upper part of the cylinder through the opening $e$ to drive down the plunger F into the lead-chamber M. The pressure of the water so forced into the cylinder, acting upon the larger area of the head of the ram, acts with great force upon the plunger F, and causes the latter to drive out the lead from the chamber M between the dies K and $p$ in the form of a tube. This tube may be cut longitudinally, to form the sheet as it descends, by means of a stationary knife attached below the bed-plate, or may be delivered onto a loosely-fitting wooden core placed below the bed-plate for its reception, and cut longitudinally to produce the sheet after the removal of the core to a horizontal position.

In this machine all difficulty of filling the lead-chamber is obviated, and the tube or sheet, being discharged from the machine in a downward direction, can be taken away from the machine without becoming buckled; and the central bolt, by which the core or inner die is held, not only receives a better lateral support from the lead-forcing plunger, and through it from the exterior wall of the lead-chamber near where the core or inner die is attached, but the said bolt is greatly reduced in length, and thus rendered less liable to be sprung in a lateral direction.

What I claim as my invention, and desire to secure by Letters Patent, is—

The arrangement of the water-cylinder, the ram, the adjustable dies, and the supporting and adjusting nut of the central bolt, which carries the male die, substantially as herein described, whereby provision is made for forcing out the lead in a downward direction and convenience is afforded for adjusting the dies to regulate the thickness.

JOHN ROBERTSON.

Witnesses:
   J. W. COOMBS,
   G. W. REED.